US008261972B2

(12) United States Patent
Ziegler

(10) Patent No.: US 8,261,972 B2
(45) Date of Patent: Sep. 11, 2012

(54) STAND ALONE PRODUCT, PROMOTIONAL PRODUCT SAMPLE, CONTAINER, OR PACKAGING COMPRISED OF INTERACTIVE QUICK RESPONSE (QR CODE, MS TAG) OR OTHER SCAN-ABLE INTERACTIVE CODE LINKED TO ONE OR MORE INTERNET UNIFORM RESOURCE LOCATORS (URLS) FOR INSTANTLY DELIVERING WIDE BAND DIGITAL CONTENT, PROMOTIONS AND INFOTAINMENT BRAND ENGAGEMENT FEATURES BETWEEN CONSUMERS AND MARKETERS

(76) Inventor: Andrew Ziegler, River Vale, NJ (US)

( * ) Notice: Subject to any disclaimer, the term of this patent is extended or adjusted under 35 U.S.C. 154(b) by 0 days.

(21) Appl. No.: 13/195,422

(22) Filed: Aug. 1, 2011

(65) Prior Publication Data

US 2012/0085829 A1 Apr. 12, 2012

Related U.S. Application Data

(60) Provisional application No. 61/391,809, filed on Oct. 11, 2010.

(51) Int. Cl.
*G06F 17/00* (2006.01)

(52) U.S. Cl. .......................................................... 235/375

(58) Field of Classification Search .................. 235/487, 235/375

See application file for complete search history.

(56) References Cited

U.S. PATENT DOCUMENTS

| | | | | |
|---|---|---|---|---|
| 4,496,051 | A * | 1/1985 | Ortner | 206/459.5 |
| 7,934,661 | B2 * | 5/2011 | Nichols | 235/494 |
| 2003/0004889 | A1 * | 1/2003 | Fiala et al. | 705/64 |
| 2006/0110719 | A1 * | 5/2006 | DeLack Hultin et al. | 434/365 |
| 2006/0263579 | A1 * | 11/2006 | Field, Jr. | 428/198 |
| 2007/0095615 | A1 * | 5/2007 | Spector | 186/52 |
| 2007/0130013 | A1 * | 6/2007 | Robert | 705/14 |
| 2008/0267504 | A1 * | 10/2008 | Schloter et al. | 382/181 |
| 2009/0127142 | A1 * | 5/2009 | Rothstein et al. | 206/308.1 |
| 2010/0150481 | A1 * | 6/2010 | Perell et al. | 383/210 |
| 2011/0244151 | A1 * | 10/2011 | George | 428/34.1 |

* cited by examiner

*Primary Examiner* — Thien M Le
*Assistant Examiner* — Toan Ly
(74) *Attorney, Agent, or Firm* — Peter B. Scull; Hamilton, DeSanctis & Cha

(57) ABSTRACT

The present invention relates to and provides methods and product, product samples, containers, or packaging comprised of interactive quick response or scan-able codes linked to Internet Uniform (or Universal) Resource Locator (URL) for providing contact information, promotional or cross promotional product samples or products, containers, or and packaging, where the product, product sample, container, or packaging, has any type of associated scan-able internet quick response URL code, quick response MS TAG or quick response QR Code that delivers an interactive "infotainment" brand experience to consumers or retailers when the product or package is scanned with a smart phone, internet tablet, computer, netbook, or other device.

19 Claims, 7 Drawing Sheets

FRONT

FRONT

BACK WITH QR

BACK WITH QR

FIG. 4A
FIG. 4B
FIG. 4C

Far Away
NEW
Far Away
EAU DE PARFUM
24
NEW
Far Away

QR Code Premiums: Business Intelligence & Intelligent Business

Premium Samples & QR Hang Tags Extend Brand Reach Globally & Connect Customers to Reps Locally

| | | SKU# | Rep ID | Sales + May | # Scans |
|---|---|---|---|---|---|
| Fragrance Top 3 SKU | Paris: #1 Womens Fragrance Scans | 5467384 | | 54% | 6,789,674 |
| | Paris: #2 Womens Fragrance Scans | 5467492 | | 49% | 5,867,432 |
| | Paris: #3 Womens Fragrance Scans | 5467569 | | 42% | 4,546,875 |
| Clothing Top 3 SKU | London: #1 Scanned Model Blouse | 4321347 | | 65% | 8,245,698 |
| | London: #2 Scanned Model Blouse | 4321425 | | 57% | 6,425,675 |
| | London: #3 Scanned Model Blouse | 4321568 | | 49% | 5,325,623 |
| Lotions Top 3 SKU | Los Angeles: #1 New Lotion Type | 3006751 | | 42% | 11,537,249 |
| | Los Angeles: #2 New Lotion Type | [illegible] | | 39% | 10,321,890 |
| | Los Angeles: #3 New Lotion Type | [illegible] | | 28% | 9,765,695 |
| Green Products Top 3 SKU | Sidney: #1 Maternity Mosquito Repellent | [illegible] | | 35% | 8,456,764 |
| | Sidney: #1 Maternity Fragrance | [illegible] | | 29% | 7,679,671 |
| | Sidney: #3 Maternity Clothes | [illegible] | | 27% | 6,234,573 |
| Top Sales Rep QR Coversion By City | Paris: | | 543687 | | |
| | London: | | 345279 | | |
| | New York: | | 237429 | | |
| Top 3 SKU Women | New York: | 3006751 | | 53% | 14,285,351 |
| | [illegible] | 4321425 | | 49% | 11,132,542 |
| | [illegible] | 5467492 | | 41% | 9,237,789 |
| Top 3 SKU Men | [illegible] | 1002951 | | 49% | 8,245,365 |
| | [illegible] | 1003782 | | 42% | 6,456,890 |
| | [illegible] | 1005693 | | 39% | 5,321,457 |
| Special 15% Promotion Contest Scan QR & Be Entered to Win Mobile Instant 15% Coupon for 48Hrs | Los Angeles: | 7775641 | | 47% | 1,557,435 |
| | Chicago: | 7774629 | | 54% | 1,136,530 |
| | New York: | 7772567 | | 59% | 2,275,876 |

EXAMPLE

FIG. 5

FIG. 7A
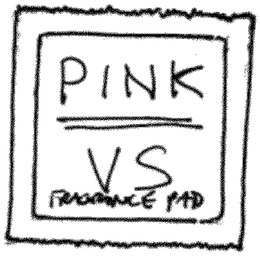
FIG. 7B
FIG. 7C
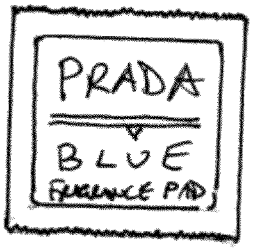
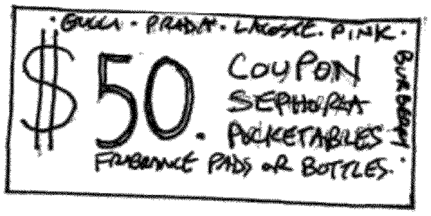
FIG. 7D

STAND ALONE PRODUCT, PROMOTIONAL PRODUCT SAMPLE, CONTAINER, OR PACKAGING COMPRISED OF INTERACTIVE QUICK RESPONSE (QR CODE, MS TAG) OR OTHER SCAN-ABLE INTERACTIVE CODE LINKED TO ONE OR MORE INTERNET UNIFORM RESOURCE LOCATORS (URLS) FOR INSTANTLY DELIVERING WIDE BAND DIGITAL CONTENT, PROMOTIONS AND INFOTAINMENT BRAND ENGAGEMENT FEATURES BETWEEN CONSUMERS AND MARKETERS

PRIORITY CLAIM

This application claims priority to, and entirely incorporates the disclosure of, U.S. provisional application No. 61/391,809, filed Oct. 11, 2010, as well as US non-provisional patent application Ser. No. 13/195,398, filed Aug. 1, 2011, entirely incorporated herein by reference.

FIELD OF THE INVENTION

The present invention relates to and provides methods, labels, products, sample product, packaging, containers, and the like for enhancing products or services, promotional labels product samples combined with interactive quick response or scan-able codes linked to internet (or Universal) Resource Locator (URL)) or other contact information, for providing promotional or cross promotional label, packaging, containers, product samples or products, and the like, and related marketing information regarding product promotional or cross-promotional features, where the product, promotional product sample, container or label or packaging carries a scan-able internet URL code, or scan-able internet URL QR code and an integral product sample.

BACKGROUND

Both manufacturers and retailers label their products with labels that include logos, brand names, sizes, colors, pricing, promotions, sweepstakes, and bar codes for scanning product at time of sale. Moreover, they need to provide detailed product information such as material composition to customers (this is often mandated by law, depending on the product).

Current printed labels contain static information versus an interactive brand experience, limited to promotion of company brand, communicating essential information to customers such as product collection name, color style, size, and a bar code with limited information that is primarily scanned by cashiers.

Current printed labels and packaging are viewed as a brand billboard that catches the eye of consumers at point-of-sale, but is often discarded by the consumer when the product is brought home. Therefore, most labels and packaging are designed for the sole purpose of communicating information to a potential customer solely at-time-of purchase.

Any enhancement or supplement to a manufacturer's printed labels or packaging must demonstrate additional sales promotion value to warrant minimal increased unit cost.

SUMMARY

The present invention relates to and provides methods and products, promotional product samples, containers, or packaging combined with promotional or cross-promotional interactive quick response scan-able codes linked to internet Uniform (or Universal) Resource Locator (URL), for providing contact information, and related marketing information regarding product promotional or cross-promotional features, where the product, promotional product sample, container, or packaging carries or uses any interactive quick response QR Code and an integral product sample, such as, but not limited to, a fragrance, a personal care product, a healthcare product, a food or beverage product, an entertainment product, a toy, a gift card, a booklet, an e-book, software, a website access code, a travel size product, a consumer electronics product, digital media storage device, a health and wellness product, a health and beauty product, a medical product, an educational product, insect repellent, anti-microbial wipes or pads, medical salves, medicines, specialized health & beauty liquids, lotions, vitamins, drink flavorings, and candy, sample or product for promotional purposes. The invention provides a digital encoded "interactive" promotional or cross promotional or cross promoted product or product sample with marketing information or price on it, with additional product sample functionality that delivers a second "brand experience" of a sample product to the consumer, as well as a third "brand experience" of a QR code or other scan-able code that links to an internet URL to provide further promotional or cross promotional features, such as, but not limited to downloadable media, promotional or cross promotional company or product websites, retail outlets, or sales representatives, products, gifts, rebates, coupons or coupon codes, discounts, sweepstakes, contests, auctions, and the like, as non-limiting examples.

The interactive QR codes, MS-Tags, or use of any other interactive URL connecting code, allows smart phone users or users of any computing device with optical scanner element to scan the code and be linked to both static data that is typically hosted by bar codes, and or specific internet URL's that can host much broader band width of data that includes text, multiple languages, audio, video, special promotions, coupons, testimonials, product specifications, MSDS documents, certifications, product demonstrations, dealer locations, retail locations, image galleries, GPS coordinates, warranty product registration forms, opt-in interactive forms.

In accordance with the above, it is an object of the present invention to provide methods and a simple, inexpensive or convenient enhancement to a conventional product, promotional product sample, or packaging for building additional sales and cross-marketing opportunities for marketers and manufacturers, by including, but not limited to, unique (GWP) "gift with purchase" product sample (e.g., fragrance, personal care product, health care product, or food or beverage), and interactive scan-able or quick response (QR) code or any similar scan-able code, for a smart phone (or other camera comprising device) for linking smart phone users to internet URL's for special promotions, coupons, and digital music or video content. New fragrance functionality makes the product a unique "olfactory interactive product", offering profitable cross-marketing of a brand's fragrance portfolio with fashion or non-fashion product categories. A promotional or cross promotional packaging with interactive URL code (e.g., but not limited to, JetScents®) is an improved product over competing products.

It is another object that a promotional or cross-promotional label of the invention or product, promotional product sample, or packaging embedded with interactive quick response internet URL code system (e.g., but not limited to, JetScents®) can be utilized to disseminate other promotional or cross promotional product samples or products, e.g., including but not limited to a fragrance, apparel or garment, a sporting goods product, a personal care product, a healthcare product, a food or beverage product, an entertainment product, a toy, a gift card, a book, an e-book, software, a website access code, an office supply product, a school supply product, a travel size product, a consumer electronics product, a health and wellness product, a health and beauty product, a medical product, an educational product, insect repellent, anti-microbial wipes, medical salves, medicines, specialized health & beauty liquids, lotions, vitamins, drink flavorings, and candy.

It is another object to provide a label, product, promotional product sample, or container or packaging that will generate a secondary brand impression and interactive experience, resulting in a lasting promotional impact with a promotional or cross-promotional label of the invention.

It is another object to provide a brand olfactory experience that will inspire viral marketing of a promotional or cross-promotional label of the invention (e.g., but not limited to, JetScents® product), and brand/fragrance/products among consumers in daily interactions, and online communities such as Facebook and Twitter.

It is another object to provide a cross-marketing of free fragrance, personal care product, or food or beverage, sample with free music sample, in the form of fragrance, personal care product, or food or beverage, sample affixed to a promotional or cross-promotional label of the invention (e.g., but not limited to, JetScents® product) fragrance products, and music sample downloaded by either scanning a promotional or cross-promotional sample product/URL internet code (e.g., but not limited to, JetScents® product)'s interactive QR-internet code that will direct smart phone users to a specific internet URL where they can download a free song, or type in specific URL address printed on a promotional or cross-promotional sample product/URL code (e.g., but not limited to, JetScents® product), where they can also download a free song or video.

It is still another object to allow retailers to integrate additional promotions and information into a promotional or cross-promotional product or package /URL code (e.g., but not limited to, JetScents® product), even though the product label or package can be affixed or printed by the manufacturer.

Another object of the invention is to provide a product, promotional product sample, or package comprising a promotional or cross promotional scan-able uniform resource locator (URL) internet directing code linking to a website or webpage that is associated with: (i) one or more promotional or cross-promotional products or services; or (ii) one or more promotional or cross-promotional materials related to said one or more promoted or cross-promoted products or services, said product or product sample, comprising:

(a) a substrate having two or more surfaces;

(b) a scan-able URL internet directing code, said URL directing code linked to a website address associated with one or more promotional or cross-promotional products or services, said scan-able code provided with, labeled on, affixed to, or provided in scan-able form as provided in a magnetic strip or other data storage device associated with at least one surface of said substrate; and (c) one or more products, packaging, or sample products provided in a removable or non-removable substrate, printed area, sheet, wipe, vial, pouch, packet, patch, container, or pad associated with, or affixed to, at least a portion of a surface of the substrate.

An object of the invention is to provide a product, promotional or cross promotional label, product sample, or packaging, wherein said label, product, packaging, or product sample is selected from one or more, but not limited to a fragrance, apparel or garment, sporting goods, a personal care product, a healthcare product, a food or beverage product, cosmetics, an entertainment product, a toy, a gift card, a booklet, an e-book, software, a website access code, a licensed product, an office supply product, a school supply product, a travel size product, a consumer electronics product, a health and wellness product, a health and beauty product, a medicine product, or an educational product.

An object of the invention is to provide a product, promotional or cross promotional label, product sample, packaging, wherein said product or product sample is in the form of a solid, a liquid, a gel, an aerosol, a spray, a powder, a pill, a composition, a freeze-dried product, a dehydrated product, a desiccated product, a compound, electronics, recordable memory, or any combination thereof.

An object of the invention is to provide a product, promotional or cross promotional label, product sample, or packaging, wherein said substrate is selected from paper, plastic, foil, foil coated paper, cardboard, wood, metal, glass, a polymer, cellulose, a postcard, cardstock, or a combination thereof, for which at least a portion of said substrate can optionally be folded, perforated, perforated for tear off demarcations, attached to or provided with a mailed or an electronic bill or statement, detachable, re-attachable, stackable with other portions, or associated with at least one tie-back, cord, pin, fastener, or tie.

An object of the invention is to provide a product, promotional or cross promotional label, product sample, or packaging, wherein said substrate, printed area, sheet, wipe, vial, pouch, packet, patch, container, or pad further comprises a peelable, resealable, closable, re-attachable, or removable sheet, removable pad, cover, latch, cap, top, container, or membrane that releases the scent of said one or more products or product samples when peeled, opened, exposed, or removed.

An object of the invention is to provide a product, promotional or cross promotional label, product sample, or packaging, wherein said product, promotional product sample, packaging or substrate is labeled with one or more brands or product or service descriptions, logos, trademarks, websites, retail locations, said scan-able URL internet code, or contact information.

An object of the invention is to provide a promotional or cross promotional label, product, product sample, or packaging, wherein said label, wipe, sheet, vial, packet, pouch, or pad is removably affixed to said substrate with a fixative, glue, cut out, latch, or sticky material or compound.

An object of the invention is to provide a promotional or cross promotional label, product, product sample, or packaging, wherein said product or sample product has a fragrance compound or composition that can be applied to a user's skin or clothing to continue to provide a fragrance, effect, or experience of said one or more products after removal from said promotional tag.

An object of the invention is to provide a promotional or cross promotional label, product, product sample, or packaging, wherein said one or more fragrances are provided in said vial or container, which can optionally be reattached or re-associated with said promotional or cross promotional label, product, product sample or packaging provided for multiple uses.

An object of the invention is to provide a promotional or cross promotional label, product, product sample, or packaging, wherein said code provides access to the user of at least one selected from a sweepstakes promotion, a rebate, a gift with purchase (GWP), a coupon, a contest, a marketing promotion, a downloadable or orderable free or fee charged music or video, a retail location or a GPS location, a website, an internet URL, a rebate, registration information, or contact information.

An object of the invention is to provide a promotional or cross promotional label, product, product sample, or packaging, wherein said GWP is selected from any product or service, a rebate, a coupon, a promotion, or downloadable or physical audio or video media.

An object of the invention is to provide a promotional or cross promotional label, product, product sample, or packaging, wherein said scan-able code is selected from a bar code, a quick response (QR) code, an alphanumeric code, a programmable code, a machine readable code or a readable code image.

An object of the invention is to provide a promotional or cross promotional label, product, product sample, or packaging, wherein said scan-able URL directing code provides quick response internet or telephone access to promotional material or to a product or service provider or promoter website, telephone number, retail location, or contact information.

An object of the invention is to provide a promotional or cross promotional product, promotional product sample, packaging, wherein said LABEL, product, promotional product sample, or package is sold separately as single unit, multiple units, or as single or multiple units in box, package, container of any type, or provided as: (i) as a stand alone product, (ii) at retailers in stores and online, or (iii) distributed for free as promotional product or materials.

An object of the invention is to provide a label, product, promotional or cross promotional label, product, product sample, or packaging is provided to a consumer or end user as a form selected from: a lanyard, a cord, a necklace, a bracelet, earrings, a toy, apparel, footwear, keychain, brochure, handout, writing instrument, or novelty promotional item.

An object of the invention is to provide a promotional or cross promotional label, product, product sample, or packaging further comprises, is affixed, is associated with, or is provided with: (i) a product or service gift card, promotion card, internet download card, media download card; label, and hanging card.

An object of the invention is to provide a promotional or cross promotional label, product, product sample, or packaging that is sold at airports, mass transport stations, and retailers promoting travel size medicines and personal care or health & beauty products.

An object of the invention is to provide a product, promotional product sample, packaging, wherein said product, promotional product sample, packaging is sold in any retail or internet sales environment, wherein said environment can optionally be selected from supermarkets, gift stores, convenience stores, department stores, fragrance stores, electronic stores, clothing stores, drug stores, sports goods stores, and restaurants.

An object of the invention is to provide a product, promotional product sample, packaging, wherein said product, promotional product sample, packaging is used for providing a message to third parties in addition to the promotional message, product or scan-able code.

object of the invention is to provide a method of providing product, promotional product sample, container or packaging, comprising a promotional or cross promotional scan-able uniform resource locator (URL)-internet directing code and a product, promotional product sample, container, or packaging, said scan-able URL-internet directing code linking to a website or webpage that is associated with: (i) one or more promotional or cross-promotional products or services; or (ii) one or more promotional or cross-promotional materials related to said one or more promoted or cross-promoted products or services, said method comprising:

(a) providing, making or using said product, promotional product sample, packaging comprising:
  a. a substrate having two or more surfaces;
  b. a scan-able URL directing code, said URL directing code linked to a website or webpage address associated with one or more promotional or cross-promotional products or services, said scan-able code provided with, printed on, labeled on, affixed to, or provided in scan-able form as provided in a magnetic strip or other data storage device associated with at least one surface of said substrate; and
  c. one or more products, promotional product samples, packaging provided in a removable or non-removable printed area, sheet, wipe, vial, pouch, packet, patch, container, or pad associated with, or affixed to, at least a portion of a surface of the substrate.

According to the present invention, the above described and other objects are accomplished by expanding the function of a product, promotional product sample, container, or package, to further include either a promotional or cross-promotional product or sample product/URL internet code (e.g., but not limited to, JetScents® product), affixing a fragrance sample such as printed area, sheet, wipe, vial, pouch, packet, patch, container, or pad sample to a cross marketed brand's packaging surface, whereby the brand experience can be transported from the retail store environment back to the customer's home where they can experience the brand's "fragrance products" at leisure (printed peel-up printed scent sample), or to apply the one-time-use fragrance via foil packet wipe, pad, gel, fragrance infused sheet, powder, or on their body.

The invention can optionally further comprise any product or service that includes, but is not limited to: fragrances, music, music videos, fashion shows, movies, women's apparel, swim wear, lingerie, menswear, accessories, sports gear, endorsed products, fan club opt-in contact URL's, concerts, TV shows, radio shows, hyperlinks to social media URL pages, such, but not limited to, Facebook™, YouTube™, or Twitter™.

The present invention further provides any invention described herein.

BRIEF DESCRIPTION OF THE DRAWINGS

FIG. 2: Schematic showing how consumers can scan interactive quick response internet QR code on a promotional label of the invention (e.g., but not limited to, JetScents® product, e.g., as shown in FIG. 1C, 1D) with smart phone, internet tablets, computers, netbooks, or other similar scanning and internet enabled electronic devices, which automatically loads and directs the internet connected electronic device to a website or webpage URL address of fragrance manufacturer, coupons, contests, or special promotions, and the like.

FIG. 3: Schematic showing how consumers can scan interactive quick response URL QR Code on a promotional label of the invention (e.g., but not limited to, JetScents® product, e.g., as shown in FIG. 1C, 1D) with smart phones, internet tablets, computers, netbooks, or other similar scanning and internet enabled electronic devices, which automatically loads and directs the device to a website or webpage URL address of fragrance distributor, manufacturer, sales representative, related social media sites/events/contests, coupons, or special promotions, and the like.

FIG. 4A-C: Illustration of promotional labels printed on a paper label adhered to a foil/plastic liner packet (FIG. 4A), product box comprising integral hanger feature (4B, 4C) of the invention (e.g., but not limited to, JetScents® product) for promoting single-use fragrance products, or larger boxed product comprising the single-use cologne or perfume/eau de parfum fragrance products, and interactive quick response internet URL QR-Code on the label or surface of the packet (FIG. 4A) or box label (FIG. 4B-C).

FIG. 5: Chart showing how product retailers, internet companies, or manufacturers can track and analyze consumers use and resulting sales of products or cross promoted products using scans of interactive quick response QR-Codes on a promotional label of the invention (e.g., but not limited to, JetScents® product) for tracking sales and scan data which can include one or more of product category, store location, time of purchase or scan, SKU number, sales representative ID, and number of scans by consumer with smart phones or other similar scanning electronic device.

FIG. 6: Illustration showing how consumers can scan interactive quick response QR-internet code on a product, promotional product sample, packaging or cross-promotional sample product/URL code (e.g., but not limited to, JetScents® product) with smart phones, internet tablets, computers, netbooks, or other similar scanning and internet enabled electronic device, which automatically loads and directs the device to website or webpage URL address of fragrance manufacturer, co-marketing partner, sponsor, coupons, contests, or special promotions, and the like.

FIG. 7A-D: Illustration of the invention (e.g., but not limited to, JetScents® product) marketed as a Designer Fragrance sampler. A retail merchandising boxed sampler of multiple fragrance brands comprised of fragrance or cologne samples and box/packaging with scan-able interactive internet URL QR-Code (FIG. 7A), packaged as single use fragrance infused wipe, pad, gel, or other health and beauty products, (FIG. 7B-C) inside foil sealed packets. Multiple samples of each fragrance type (or other health and beauty products), with gift coupon (FIG. 7D) that can be redeemed for fragrance (or other health and beauty products) purchase either at retail store or online.

DESCRIPTION

Figure 1A:
FIG. 1A-D: Illustration of two promotional labels printed on a paper label, adhered to a foil/plastic liner packet of the invention (e.g., but not limited to, JetScents® product) for promoting a single use fragrance product on a towlette, wipe, gel, or pad, comprising cologne or perfume/eau de parfum (FIGS. 1A-D), and interactive quick response scan-able [internet URL] QR Code on the label or surface of the packet (FIGS. 1C, 1D).

The present invention relates to and provides methods and product, promotional product sample, containers, packaging combined with promotional or cross-promotional interactive quick response or scan-able codes linked to internet Uniform (or Universal) Resource Locator (URL), for providing contact information, and related marketing information regarding product promotional or cross-promotional features, where the product, promotional product sample, containers, or packaging comprised of any type or format of promotional or cross-promotional scan-able quick response internet URL code, such as but not limited to MS TAG, or QR code, and wherein the sample or product can include, but is not limited to, a fragrance, a personal care product, a healthcare product, a food or beverage product, an entertainment product, a toy, a gift card, a book, an e-book, software, a website access code, an office supply product, a school supply product, a travel size product, an inhaler, a consumer electronics product, a health and wellness product, a medicine sample, a health and beauty product, or an educational product, sample or product for promotional purposes. The invention can replace "inactive brand tag" with an "interactive" promotional or cross promotional tag or label that has product or cross promoted product or provides a product, promotional product sample, container, or packaging with marketing information or price on it, along with additional product sample functionality, that delivers a second "brand experience" of a promotional or cross-promotional QR code or other scan-able code that links to a URL to provide further promotional or cross promotional features, such as, but not limited to downloadable media, promotional or cross promotional company or product websites, webpages, retail outlets, or sales representatives, products, gifts, rebates, coupons or coupon codes, discounts, sweepstakes, contests, auctions, and the like, as non-limiting examples.

The interactive QR codes, MS-Tags, and any other URL interactive code format is that these URL internet connecting "interactive codes" allow smart phone users or users of any computing device with optical scanner element to scan the code and be linked to both static data that is typically hosted by bar codes, and or specific internet URL's that can host much broader band width of data that includes text, multiple languages, audio, video, special promotions, coupons, testimonials, product specifications, MSDS documents, certifications, product demonstrations, dealer locations, retail locations, image galleries, GPS coordinates, warranty product registration forms, opt-in interactive forms.

The present invention further provides uses of QR codes or similar scan-able codes (as well known in the art, e.g., US patent/application publication nos: U.S. Pat. No. 6,637,662, US20080309976, U.S. Pat. No. 6,494,375, entirely incorporated herein by reference) associated with a promotional or cross promotional product, promotional product sample, packaging, where the QR or similar code links to a promotional or cross promotional internet URL, wherein:

a) QR (quick response) or similar codes can be used in any single use packaged product or product sample for sale or use as premium incentive give away, to include but not limited to product or product sample provided in or as one or more of: printed areas, sheets, wipes, vials, pouches, packets, patches, containers, pads packets, pouches, boxes, containers, mini-aerosols, aerosols, sprays, and the like. The product or product sample can be in the form or one or more of a fragrance, apparel or garment product, a personal care product, a healthcare product, a food or beverage product, an entertainment product, a toy, a gift card, a book, an e-book, software, a website access code, an office supply product, a school supply product, a travel size product, an inhaler, a consumer electronics product, a health and wellness product, a health and beauty product, a sporting goods product, or an educational product; and/or b) QR (quick response) or similar scan-able URL codes can be printed directly on products, printed on labels, printed on tags, molded in, embossed in, or hot stamped in, or be used for promotional or cross promotional commercially sold goods such as, but not limited to fashion accessories with interactive QR-code features, to include products, brochures, coupons, packaging, belts, necklaces, bracelets, earrings, shoes, boots, sandals, tags, hang tags, website promotions, videos, books: apparel and garments with interactive QR-code features, including but not limited to shirts, pants, jeans, dresses, blouses, hats, scarves, swim wear, jackets, sweaters, lingerie, underwear, robes, ties, packaging, hangers and hanger covers, protective bags, labels, tags, hang tags, catalogs, brochures, coupons, gift cards:, food packaging with interactive QR-code features, to include products, boxes, and single use or travel size packaging of food: beverage packaging with interactive QR-code features, to include and single use or travel size beverage packaging to include boxes, cartons, bottles, cans, and pouches: health and beauty packaging with interactive QR-code features, to include, containers, bottles, vials and single use or travel size bottles, inhalers, tubes, packets, pouches, wipes, pads, gels, creams, powders, eye liners, nail polish, hair dye, temporary tattoo decals, nail art, catalogs, coupons; consumer electronic products with interactive QR-code features, to include to product, packaging, boxes, manuals, catalogs, labels, tags: major home appliances with interactive QR-code features, to include to product, packaging, boxes, manuals, catalogs, brochures, labels, tags: sporting goods with interactive QR-code features, to include to product, apparel including shirts and jackets and pants and hats and scarves and tee shirts and high performance shirts, outdoor goods, weapons, extreme sports gear, skis, snowboards, tennis products, baseball products, soccer products, swim wear, running gear and apparel, replenishable products, packaging, boxes, manuals brochures, labels, tags: automotive, truck, RV, marine, ATV, snowmobile, scooter, or motorcycle products, accessories or care products (e.g., helmets, gloves, protective gear, branded apparel or footwear, detailing, interior or exterior accessories, cleaning and painting products, and the like) with interactive QR-code features, to include to product, packaging, boxes, manuals, brochures, catalogs, warrantees, labels, tags, personal care packaging with interactive QR-code features, to include to include any package, brochures, catalogs, or container type or single use or travel size packaging including bottles, tubes, pouches, wipes, pads, boxes, pencils, gels, powders, creams; medicine packaging with interactive QR-code features, to include, brochures, containers, tubes, bottles, blister packs, and single use or travel size bottles, tubes, packets, pouches, wipes, pads, gels, powders, pills, liquids, powders: Toys products and packaging with interactive QR-code features, to include to boxes, manuals, brochures, board games, action figures, dolls, science games, IQ games, product or product sample, labels, tags, tubes, posters, websites with scan-able interactive QR-codes; Licensed Brand Products and packaging with interactive QR-code features, to include to include boxes, manuals, brochures, product or product sample labels, tags, products, tubes, posters, websites with scan-able interactive QR-codes; Gift Cards and Gift Card Packages with interactive QR code features, to include downloadable audio and video media, promotions, testimonials, coupons; e-Books with interactive QR code features to include, Digital audio books, and digital text books to include e-book packaging, e-book gift cards and gift card packages with interactive QR-code features, to include downloadable e-book samples via QR-codes on packaging or accessed via websites; Books with interactive QR code features, to include printed books with scan-able interactive QR-code URL's, QR-codes printed on book jackets, QR-codes printed on book pages offering a new and unique interactive feature that delivers additional audio and video content, QR-codes on packaging and labels, Software packages with interactive QR-code features, to include downloadable product demonstrations in audio and video formats; Sight Impaired Products and Packaging with interactive QR-code features, to include product packages and printable content whereby QR-codes can be printed next to braille or printed text words, or just be printed, and whereby a blind or sight impaired user can use their smart phone to scan the product package to get an instant audio or video synopsis of the product.

The present invention relates to methods and product, promotional product sample, container, packaging, or promotional tags and/or labels with product samples, samples of fragrance, single use samples of fragrance, personal care products, or foods or beverages, combined with interactive quick response internet (QR Code) or any similar scan-able codes linked to internet URL for providing contact information, promotional or cross promotional product samples or products and information regarding product promotional or cross-promotional features such as, but not limited to, sweepstakes, contests, coupons, music downloads, pricing, specifications, contact information, and manufacturing thereto that carries a scan-able URL internet hyperlink code and an integral fragrance, personal care product, or food or beverage, sample for sale or promotional purposes. The invention makes obsolete "inactive brand tag or hang tag" with an "interactive" promotional or cross promotional label, product, product sample, or packaging that digitally and visually communicates product information, or cross promoted product information or price on it, with additional benefit of fragrance, personal care product, food or beverage sample functionality that delivers a second "brand experience" of a product sample to the consumer, and third "brand experience" of an interactive web based sweepstakes, contest, or download or access via web address, bar code, QR-Barcode, MS Tag, or any other scan-able interactive URL hyperlink code, as non-limiting examples.

The promotional or cross promotional product sample product or product can include one or more of any suitable product sample, in the form of a solid, a liquid, a gel, an aerosol, a spray, a powder, a pill, a composition, a freeze-dried product, a dehydrated product, a desiccated product, a compound, electronics, recordable memory, or any combination thereof, which provides any promotional or cross-promotional function.

In an embodiment, the invention relates to a mechanical design of a promotional or cross-promotional product, product sample/URL code (e.g., but not limited to, JetScents® product) to include one or more of 7 distinct functions: 1) Display brand name, 2) display brand website and contact information, 3) display primary product model number, price, 4) display scan-able barcode, 5) Display smart phone scan-able quick response QR internet code or any other scan-able code for linking the consumer directly to the manufacturers website or any singular URL on the internet, 6) hold fragrance, personal care product, or food or beverage, sample via sheet, wipe, vial, pouch, packet, patch, gel, or pad, 7) have die cut hole for affixing cord, lanyard, wire, swift tack fastener, safety pin, adhesive back, as a means to affix the JetScent® tag to clothing, products, cans, bottles, or lanyard necklace for sales and promotional purposes.

In an embodiment, the invention relates to a promotional or cross-promotional product or product sample /URL code (e.g., but not limited to, JetScents® product), printed area, sheet, wipe, vial, pouch, packet, patch, container, or pad, bracelet, postcard, or the like, that combines sample delivery system with product brand name, logo, pricing, size, website, model identifiers, bar codes, scan-able interactive internet quick response MS TAG or QR Code, or any internet enabled scanning device including but not limited to smart phones, computers, netbooks, laptops, internet tablets.

A promotional or cross-promotional product, product sample/URL code (e.g., but not limited to, JetScents® product) can be hung or affixed to, but is not limited to, clothing products, fragrance products, apparel and garments, fashion accessories, health & beauty products, music CD jewel cases, toys, sporting goods, alcoholic beverage cans/bottles, non-alcoholic, cans/bottles, tobacco products, automotive and motorcycle products, medical products, and the like, by "swift tack" (i.e., a lopped plastic fastener applied by a gun), fiber/plastic/wire cord, adhesive, safety pin, and any other fastener or fastening means, can include either integral one-time use product sample in the form of printed area, sheet, wipe, vial, pouch, packet, patch, container, or pad sample for promotional purposes.

In another embodiment, the invention relates to an integral single use printed area, sheet, wipe, vial, pouch, packet, patch, container, pad, product or product sample that can be manufactured from paper, synthetic or natural wipe material, synthetic or natural pad material, plastic, polymer, glass, woven or porous material, or metal, foil, or printed ink, or any combination thereof. The product, promotional product sample, packaging for promotional or cross-promotional product/URL code (e.g., but not limited to, JetScents® product) allows retailers to inexpensively sell or disseminate product, product samples of promotional or cross-promotional boxes on peg hooks, shelves, or attached to other products, e.g., but not limited to, garments, apparel, health and beauty products, automotive products, boxes, food and beverage products, optometry products, bottles, accessories, toys, direct mail promotions, and gift cards. The unique promotional packet, container, or package allows consumers to experience the sample brand, and in the case of the one-time use sample printed area, sheet, wipe, vial, pouch, packet, patch, container, or pad, allows the consumer to apply the actual sample on clothing or skin, or to taste, to fully enjoy the benefits of the actual product. A promotional or cross-promotional sample product/URL code (e.g., but not limited to, JetScents® product) adds a unique, "infotainment", new interactive sales promotion functionality to packages, boxes, containers, and products promoted by retailers and distributors, for enhancing sales in the product category, can replace bar code tags or substantially impart new interactive promotional features to hang tags used by numerous retailers, can, in addition to cross-promoting products and brands, and enable disseminate more than one single promotional offer. Additional functions of any applied interactive quick response internet URL codes, including but not limited to scan-able internet QR Codes and MS TAGS, include instant delivery of, e.g., but not limited to, coupons, sweepstakes, contests, audio and video, social media links, and special promotions to smart phone users, or users of any internet enabled device with camera feature, such as but not limited to smart phones, laptops, computers, scanners, netbooks, and computer tablets.

No other product, promotional product, package, container, tag, label exists today that has a 5-in-1 functionality, of one or more of: 1) a visual brand informational placard; 2) a scan-able barcode 3) interactive Quick Response QR/MS Tag or any other smartphone scan-able code that can be photographed by smartphones and link the consumer instantly and directly to a specific internet URL for promotions, contests, coupons, videos 4) QR-Code or any other scan-able interactive code that can be scanned by smart phone users to instantly link them to an internet URL where they can download free song 5) mobile method to experience and be educated on new and exciting features of the brand instantly in retail selling environment, or at home, and motivate the consumer with to make an additional purchase of products from the manufacturer or retailer via their website, webpage, or at retail store.

The product, promotional product sample, container, or packaging/URL code comprising a quick response internet URL code and sample, packaging, product label or sample, consisting of an associated printed area, sheet, wipe, vial, pouch, packet, patch, container, or pad, that can be manufactured for minimal cost, combining the existing attributes of the a larger more costly bottle version of the same brand into a convenient, travel size packet or single use version of the product with the added value of an "interactive product brand experience" of the product sample delivery system, audio and video delivery system, and information delivery system in one simple-to-manufacture product, cross-promotional product, or promotional product sample/URL code (e.g., but not limited to, JetScent® product).

A printed promotional or cross-promotional sample product/URL code (e.g., but not limited to, JetScent® product) is comprised of a coated paper or plastic stock that can be imprinted with a sample provided in an associated printed area, sheet, wipe, vial, pouch, packet, patch, container, or pad. The hard coated paper stock or plastic creates and air barrier that is impervious to releasing or admitting air that would evaporate or degrade samples found in the printed area, sheet, wipe, vial, pouch, packet, patch, container, or pad. First the sample is provided in a sealed or contained printed area, sheet, wipe, vial, pouch, packet, patch, container, or pad in any desired shape on the hard coated paper stock or plastic, then the paper or plastic stock can be printed with a separate continuous ringed shape of adhesive. The paper or plastic stock then receives a die cut of the hang-tag hole, a score line is applied at the mid-point for folding, and a promotional or cross-promotional sample product/URL internet code (e.g., but not limited to, JetScents® product) outer shape is die cut out of the main paper roll. At this time, the paper stock blanks are folded in half, back onto itself, whereby the continuous ring of adhesive forms an airtight seal around the fragrance sample imbedded inside. The printed promotional or cross-promotional sample product/URL code (e.g., but not limited to, JetScents® product) can have a graphic label that includes all brand information and promotions, along with a demarcation alerting consumer to peel back or open the sample provided in a printed area, sheet, wipe, vial, pouch, packet, patch, container, or pad, associated with or provided with or attached to a promotional or cross-promotional sample product/URL code to experience the brands fragrance, personal care product or food or beverage product.

A promotional or cross-promotional product or product sample/URL internet code (e.g., but not limited to, JetScents® product) can be manufactured without a die-cut hang-tag hole, and can be manufactured with an adhesive back for applying to any product surface, including, but not limited to, boxes, music jewel cases, bottles, cans, car windows, car mirrors, wholesale and retail gift cards. The printed promotional or cross-promotional sample fragrance process can also be used to manufacture promotional interactive wrist tag product/URL with any scan-able quick response URL internet codes, or MS TAG, QR Codes, and can be mailed or handed out as premium samples at any event, including but not limited to retail, fashion, sporting, and entertainment events. The promotional or cross-promotional sample product/URL code comprising a sealed or contained product sample and QR Quick Response codes can also be used to manufacture inexpensive promotional products, product samples, or product gift cards, postcards, and hang tags that can be hung on walls.

The printed promotional or cross-promotional product/URL code or bracelets can be marketed as a multi-pack of single sample type, or an assortment of multiple sample types that can be packaged in a single or multiple boxes, and offered as either a premium incentive, or sold as a boxed sample assortment. The package can include any of the following, printed promotional or cross-promotional sample product/URL code for home or auto use, tag associated bracelets, earrings, and special promotions such as coupons or limited time purchase offers, contests, sweepstakes etc. The promotional or cross-promotional sample product/URL code can be manufactured with or without the interactive QR Quick Response code on each product packet, or manufactured with the QR Quick Response code printed just on the product package.

The one-time-use promotional or cross-promotional sample product /URL code is comprised of a "sample printed area, sheet, wipe, vial, pouch, packet, patch, container, or pad" that is sealed or contained, which can optionally be comprised of a printable paper or foil outer layer laminated to a metal foil interior layer, creating an airtight packet that contains at least one printed area, sheet, wipe, vial, pouch, packet, patch, container, or pad comprising at least one of a fragrance, personal care product, or food or beverage, sample. The "sample printed area, sheet, wipe, vial, pouch, packet, patch, container, or pad" packet can be affixed with an adhesive to the inside or front surface of any paper, metal, plastic, wire, glass, or any synthetic material, including but not limited to any product surface such as, but not limited to, boxes, music jewel cases, bottles, cans, car windows, car mirrors, wholesale and retail gift cards, and as promotional premium in the form of packet, promotional necklace, promotional keychain, promotional bracelet.

The present invention can provide one or more of the following non-limiting embodiments, as described herein and/or as well known in the art:

A product of the invention as a unique combination of a brand hang tag and fragrance sample, printed onto the tag material, such as paper, plastic, foil, foil coated paper, allowing for consumer to peel back "protective seal cover" of the tag to experience the fragrance, personal care product or food or beverage sample. (see, e.g., FIG. 5)

Figure 1B:
Figure 1C:
Figure 1D:
Figure 2:
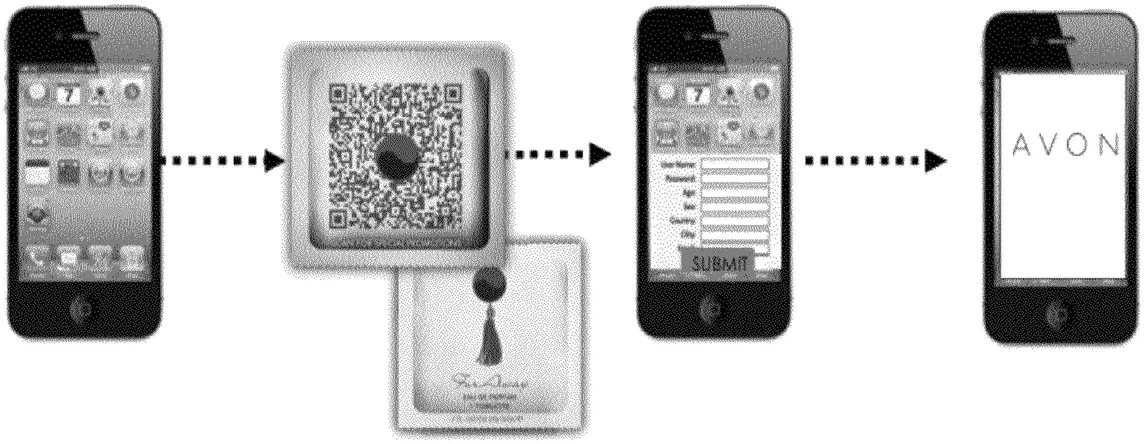
Figure 3:

A product of the invention as a unique combination of a brand tag and fragrance, personal care product or food or beverage sample, whereby a fragrance, personal care product or food or beverage wipe or pad packet is affixed to hang tag with glue or gummy material, allowing for it's removal and one-time use to experience the product or full fragrance aroma on the consumer's body or clothing. (see, e.g., FIGS. 1-4.)

A product of the invention as a unique combination of a brand tag and fragrance, personal care product or food or beverage sample, whereby a fragrance, personal care product glass vile is affixed to the Fragrance Tag via pop-up die cuts in the material, allowing for it's removal and multiple uses to experience the sample on the consumer's body or clothing.

A product of the invention as a unique combination of a brand tag and fragrance, or personal care product, whereby a fragrance or personal care product in a container is affixed to the Fragrance Tag with glue or gummy material, allowing for it's removal and one-time use to experience the full aroma on the consumer's body or clothing.

A product of the invention as a unique combination of brand tag, fragrance, personal care product, or food or beverage, sample, and sweepstakes promotion, all combined in one product. (see, e.g., FIG. 1, FIG. 5)

A product of the invention as a unique combination of brand tag and fragrance sample, whereby the product is an actual GWP Gift With Purchase product unto itself, being distributed with other products to broaden the marketing reach for the fragrance, personal care, health product, or food or beverage, products. Unique applications of as GWP would be, e.g., but not limited to, clothing, sporting goods, travel gear, beverage cans and bottles and pouches, beer bottles and packaging, music CD's, DVDs, videos, audio files.

A product or method of the invention as a unique interactive physiological and psychological sales tool that stimulates the olfactory senses, sending messages to the brain, and motivating the consumer to explore and purchase the fragrance manufacturers wares both online, with mobile devices, and at retail stores.

A product of the invention as a unique interactive sales tool, whereby a consumer that does not purchase the product that the fragrance, personal care product, or food or beverage sample tag is affixed to, but is still presented the opportunity to scan the internet URL QR-Code with any smart phone, computer, netbook, internet tablet, or internet connected device with scanning feature, to be directed to the fragrance, personal care product, or food or beverage, manufacturer's or co-marketing partner's web site, web page, contact address or phone number, or any designated internet URL for additional information.

A necklace as a unique premium promotional product of the invention incorporating A promotional or cross promotional tag or label that can be affixed to a lanyard necklace, or manufactured as an event pass, and distributed at trade events, social networking events, music events, fashion events, and or any indoor or outdoor sales or cultural event to cross-promote designer fragrances with fashion apparel, music, videos, or any other product or service. The lanyard, cord, or chain necklace uses the exclusive printed fragrance delivery system or affixed single-use Designer Fragrance sample wipe or pad packet, in combination with any scan-able interactive internet URL code, MSTAG, or quick response QR-Code that can instantly deliver promotions, contests, videos, music downloads to smart phones, netbooks, computers, scanners, or any internet enabled device with camera function. There is currently no necklace product like this in the market.

A product of the invention as a single-use fragrance or multiple printed fragrance sampler can be printed on card stock, and sold as postcard product(s).

Figure 6:
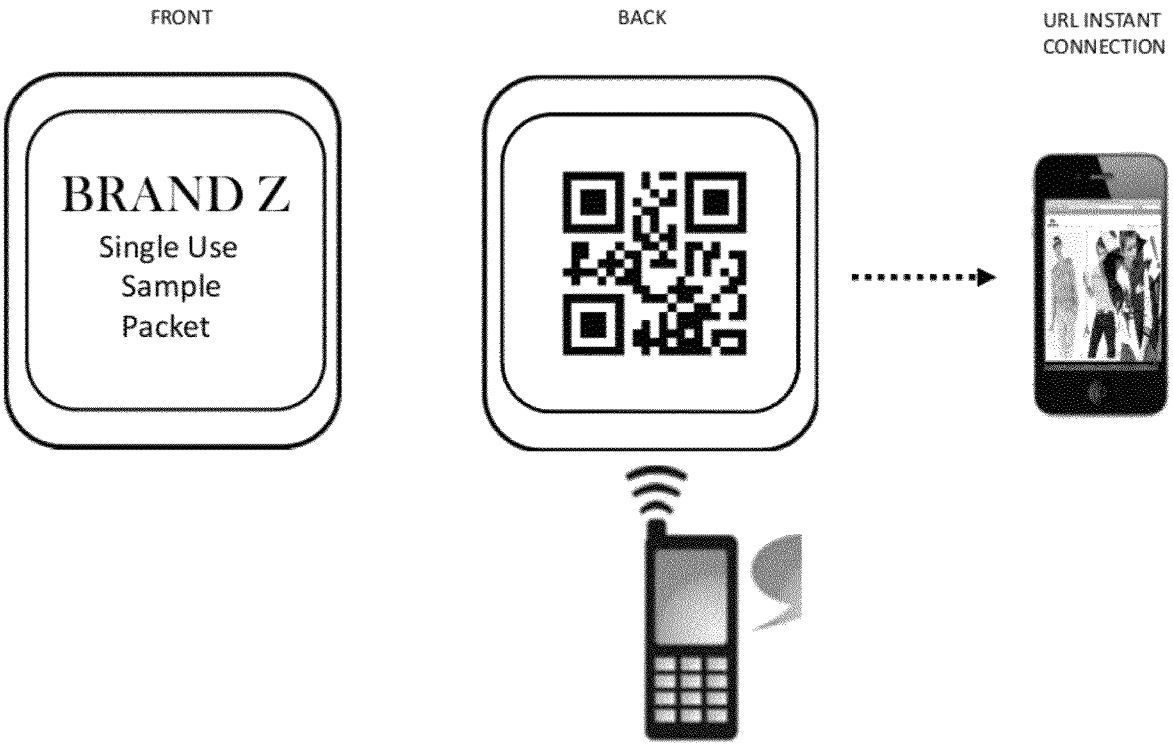

A product of the invention as a revolutionary interactive sales, marketing, or merchandising, tool that goes home with customer, allowing the brand manufacturer to enjoy the benefits of an in-home personalized one-time use of the product, or a "night out on the town" trial use of the product. (see, e.g., FIGS. 1-7.

The use of the interactive scan-able URL code, barcode or QR code on a product of the invention as a user or consumer engages consumers to use their smart phone or other internet access device camera feature to scan the interactive URL scan-able code or QR Quick Response code that links to the manufacturer's brand via distinct URL web address, in conjunction with the consumer interaction with the fragrance, represents two distinct brand impressions not currently available on product hang tags or labels.

A product of the invention as Multiple Fragrance Hang Tag, produced as printed scent samples on paper with perforated tear off demarcations. Fragrance sampler papers are sealed with fold over flap of paper for preventing evaporation of fragrance. Folded over paper is then folded in an accordion type fashion, into a single stack of fragrances that can be affixed via a tie-back, cord, or pin with cord to products, or sold separately as a stand alone product.

A product of the invention as Promotional Post Card Hang Tag or Post Card Hang Tag Coupon with either a peel up printed fragrance or adhesive adhered wipe or pad fragrance sample on one side of back of the hang tag card, and other side of back of the card has area for writing note, address, and placing stamp. Front of the post card has brand image and special coupon promotion, website address, any interactive URL scan-able code, or Quick Response scan-able QR code that engages consumer with interactive brand experience, special promotions, audio and video media, online or mobile opt-in mailing list form. The present invention can also provide for adding one or more holes to the card for hanging on peg at retail also makes it become a large fragrance tag.

A product of the invention as printed, packet wipe or pad configurations can be manufactured as promotional branded jewelry (e.g., but not limited to, earrings, necklaces, lanyard necklaces, bracelets) or event passes that includes a fragrance and interactive QR Quick Response smart phone internet URL code for instant download of coupons, music, promotions, contests, and sweepstakes at any type of event. Particularly at sports and music events, celebrity endorsed exclusive fragrance jewelry can easily be disseminated at events.

A product of the invention as an Interactive Auto Hang Tag with printed peel up label to release fragrance, or a fragrance impregnated hang tag with any scan-able URL interactive code such as but not limited to MS-TAG, or QR-Code for cross-marketing any product, or auto accessory store and Designer Fragrance Brand. The auto hang tag is the first fragrance hang tag for automobile use that provides a Designer Fragrance aroma, promotes a brand logo or image, and has interactive QR Quick Response internet URL code that allows drivers to scan the code with smart phones, netbooks, computers, internet tablets, or any camera featured internet connected device, to get instant download of coupons, contests, special promotions, music, video, sponsorship messages, or locations and GPS locations where the fragrance is sold. This inexpensive Designer Fragrance auto hang tag can be sold at automotive accessory retailers, convenience stores, retailers, gas stations, wholesalers, or distributed as a premium product cross-promoting any products including automotive retailer brands, locations, websites and webpages with Designer Fragrance brands.

A product of the invention as Direct Mail Coupon Hang Tag Designer Fragrance Coupon designed as a hang tag with cord hole that allows it to be affixed to a gift box. Direct Mail Coupon Hang Tags are inserted into credit card bill envelopes, and use printed peel-up scent samples and any interactive URL scan-able code such as MS TAG or QR Quick Response internet URL codes for engaging consumers with both an olfactory scent experience and interactive brand impression that inspires consumer engagement with fragrance manufacturers website or webpage, for viewing and purchasing products, activating coupons, viewing promotions and cross-promotions, and opting-in for special online or mailed promotions.

POTENTIAL ASPECTS OR ELEMENTS OF THE CLAIMED INVENTION THAT CAN BE OPTIONALLY EXCLUDED OR NEGATIVELY CLAIMED. The present invention can also in particular claimed embodiments exclude or negatively claim one or more aspect of the following list, e.g., to more particularly recite or exclude embodiments or elements that might occur in cited or other published art. Accordingly, the present invention can optionally exclude, not include, or not provide, one of more of promotional, cross promotional, product, sample product, packaging or container, a particular type of scan-able uniform resource locator (URL)-internet directing code, a particular promotional product sample, product, one or more particular promotional or cross-promotional products or services; one or more promotional or cross-promotional materials related to said one or more promoted or cross-promoted products or services, a particular type of substrate having two or more surfaces, a particular scan-able code provided with, labeled on, affixed to, or provided in scan-able form as provided in a magnetic strip or other data storage device associated with at least one surface of said substrate; one or more sample products provided in a removable or non-removable, provided in one or more of a printed area, sheet, wipe, vial, pouch, packet, patch, container, or pad, associated with, or affixed to, at least a portion of a surface of the substrate; one or more particular types of fastener or attachment means configured to secure the substrate to an external surface or secondary product; one or more of a particular product or product sample selected from one or more of a fragrance, a personal care product, a healthcare product, a food or beverage product, an entertainment product, a toy, a gift card, a booklet, an e-book, software, a website access code, a licensed product, an office supply product, a school supply product, a travel size product, a consumer electronics product, a health and wellness product, a health and beauty product, a medicine product, or an educational product.

The present invention can optionally exclude, not include, or not provide, one of more of a product or product sample in the form of one or more of a solid, a liquid, a gel, an aerosol, a spray, a powder, a pill, a composition, a freeze-dried product, a dehydrated product, a desicated product, a compound, electronics, recordable memory, or any combination thereof; a substrate selected from paper, plastic, foil, foil coated paper, cardboard, wood, metal, glass, a polymer, cellulose, a postcard, cardstock, or a combination thereof, for which at least a portion of said substrate can optionally be folded, perforated, perforated for tear off demarcations, attached to or provided with a mailed or an electronic bill or statement, detachable, re-attachable, stackable with other portions, or associated with at least one tie-back, cord, pin, fastener, or tie.

The present invention can optionally exclude, not include, or not provide, one of more of a peel able, resealable, closable, re-attachable or removable sheet, removable pad, cover, latch, cap, top, container, or membrane that releases the scent of said one or more products or product samples when peeled, opened, exposed, or removed; one or more brands or product or service descriptions, logos, trademarks, websites, retail locations, said scan-able code, or contact information; a fixative, glue, cut out, latch, or sticky material or compound; at least one selected from a sweepstakes promotion, a rebate, a gift with purchase (GWP), a coupon, a contest, a marketing promotion, a downloadable or orderable free or fee charged music or video, a retail location or a GPS location, a website, an internet URL, a rebate, registration information, or contact information; a GWP selected from a rebate, a coupon, a promotion, or downloadable or physical audio or video media; a bar code, an alphanumeric code, a programmable code, a machine readable code or a readable code image; a product or service provider or promoter website, telephone number, retail location, or contact information; sold or provided as: (i) as a stand alone product, (ii) at retailers in stores and online, or (iii) distributed for free as promotional materials; a lanyard, a cord, a necklace, a bracelet, earrings, a toy, apparel, footwear, keychain, brochure, handout, writing instrument, or novelty promotional item; a product or service gift card, promotion card, internet download card, media download card; label, and hanging card.

It will be clear that the invention can be practiced otherwise than as particularly described in the foregoing description and examples or as interpreted by one skilled in the art or applicable technology areas.

Numerous modifications and variations of the present invention are possible in light of the above teachings and, therefore, are within the scope of the present invention.

What is claimed is:

1. A cross promotional product, product sample, container, or packaging comprising a cross promotional, scan-able uniform resource locator (URL)-internet directing two dimensional code linking to a website or web page including cross promotional information about: (i) one or more cross promotional products or services; or (ii) one or more cross-promotional products or materials related to said one or more cross promotional products or services, said cross promotional product, product sample, container, or packaging comprising:

(a) said cross promotional scan-able URL internet directing two dimensional code associated with a substrate having one or more surfaces, said URL directing two dimensional code linked to a website or webpage address including cross promotional information about cross-promotional products or services, said scan-able two dimensional code provided with, labeled on, printed on, lasered on, affixed to, molded in, or embossed on at least one surface of said substrate; and (b) one or more of said cross promotional products, cross promotional product samples, cross promotional containers, or cross promotional packaging provided with said substrate, said URL internet directed two-dimensional code provided in a removable or non-removable printed area, sheet, wipe, vial, pouch, packet, patch, container, or pad associated with, or affixed to, at least a portion of a surface of the substrate;

wherein said cross promotional products, cross promotional product samples, cross promotional containers, or cross promotional packaging are provided with one product or service selected from the group consisting of a first product and information material about a first service, wherein the cross-promotional product or service is not the same particular product or service as said first product or said first service.

2. A cross promotional product, product sample, container, or packaging according to claim 1, wherein said product, product sample, container, or package contains or is selected from one selected from the group consisting of a fragrance, apparel, sporting goods, a personal care product, a healthcare product, a food or beverage product, an entertainment product, a toy, a gift card, a book, an e-book, software, a website access code, digital product or storage medium, an office supply product, a school supply product, a travel size product, a consumer electronics product, a health and wellness product, a health and beauty product, or an educational product, an automotive product, an insect repellent, anti-microbial wipes, medical salves, medicines, specialized health & beauty liquids, a lotion, vitamins, drink flavorings, and candy.

3. A cross promotional product, product sample, container, or packaging according to claim 1, wherein said product, cross promotional product sample, container or packaging contains or is in the form of one selected from the group consisting of a solid, a liquid, a gel, an aerosol, a spray, a powder, a pill, a composition, a freeze-dried product, a dehydrated product, a desiccated product, a compound, electronics, recordable or digital memory, and any combination thereof.

4. A cross promotional product, product sample, container, or packaging according to claim 1, wherein said substrate is selected from the group consisting of paper, plastic, foil, foil coated paper, cardboard, wood, metal, foil, glass, a polymer, cellulose, a postcard, cardstock, and a combination thereof, for which at least a portion of said substrate can optionally be folded, perforated, perforated for tear off demarcations, attached to or provided with a mailed or an electronic bill or statement, detachable, re-attachable, stackable with other portions, or associated with at least one tie-back, cord, pin, fastener, or tie.

5. A cross promotional product, product sample, container, or packaging according to claim 1, wherein said substrate, printed area, sheet, wipe, vial, pouch, packet, patch, container, or pad further comprises a peelable, resealable, closable re-attachable, or removable sheet, cover, latch, cap, top, container, pouch, packet, or membrane that either releases the scent of said one or more products or product samples, or allows access to food, beverage, snack, candy, health and beauty product, secret code, digital device, or contest identifier when peeled, opened, exposed, or removed.

6. A cross promotional product, product sample, container, or packaging according to claim 1, wherein said product, product sample, or substrate has affixed or printed label with one or more brands or product or service descriptions, logos, trademarks, websites, webpages, retail locations, said scan-able URL internet directing two dimensional code, or contact information.

7. A cross promotional product, product sample, container, or packaging according to claim 1, wherein said printed area, sheet, wipe, vial, pouch, packet, pouchpatch, container, or pad is removably affixed to said substrate, container, or packaging with a fixative, glue, cut out, latch, or sticky material or compound.

8. A cross promotional product, product sample, container, or packaging according to claim 1, wherein said product or sample product has a fragrance or composition that can be applied to a user's skin or clothing to continue to provide a fragrance, effect, or experience of said one or more products after removal.

9. A cross promotional product, product sample, container, or packaging according to claim 1, wherein said one or more products or product samples are provided in said printed area, sheet, wipe, vial, pouch, packet, patch, container, or pad, which can optionally be provided for multiple uses.

10. A cross promotional product, product sample, container, or packaging according to claim 1, wherein said scan-able URL internet directing two dimensional code provides access to the user of at least one or more products or services selected from a sweepstakes promotion, a rebate, a gift with purchase (GWP), a coupon, a contest, a marketing promotion, a downloadable or orderable free or fee charged music or video, a retail location or a GPS location, a website, an internet URL, a rebate, a coupon, an exclusive internet only promotion, registration information, or contact information.

11. A cross promotional product, product sample, container, or packaging according to claim 10, wherein said GWP is selected from any product or service, a rebate, a coupon, a promotion, or downloadable or physical audio or video media.

12. A cross promotional product, product sample, container, or packaging according to claim 1, wherein said scan-able URL internet directing two dimensional code provides internet or telephone access to cross promotional material or to a product or service provider or promoter website or web page, social media web site, promotional audio or video, telephone number, retail location, or contact information.

13. A cross promotional product, product sample, container, or packaging according to claim 1, wherein said product, cross promotional product sample, container (pouch, packet, bottle, box, vial, envelope, tube, blister pack, or packaging is sold or provided: (i) as a single use or multi-use resealable stand alone product, (ii) at retailers in stores and online, or (iii) as distributed for free or with promotional materials.

14. A cross promotional product, product sample, container, or packaging according to claim 1, wherein said product, promotional product sample, or container packaging as provided to a consumer or end user comprises or further comprises at least one selected from the group consisting of: a lanyard, a cord, a necklace, a bracelet, earrings, a toy, apparel, footwear, fragrance, powder, health and beauty product, fragrance, sporting goods, footwear, apparel, candy, promotional code, keychain, brochure, handout, writing instrument, clock, compass, and novelty promotional item.

15. A cross promotional product, product sample, container, or packaging according to claim 1, wherein said product, cross promotional product sample, container, or packaging further comprises, is affixed, is associated with, or is provided with one selected from the group consisting of: (i) a product or service gift card, product or gift card hanging holiday ornament, promotion card, internet download card, media download card; label, and hanging card.

16. A cross promotional product, product sample, container, or packaging according to claim 1, wherein said product, packaging, or product sample is used for providing a message to third parties in addition to the cross promotional message, product or scan-able URL two dimensional code.

17. A cross promotional product, product sample, container, or packaging according to claim 1, wherein said interactive scan-able URL-internet two dimensional code integrates or cross-promotes at least one of brands, products, properties, or a licensed product or service.

18. A cross promotional product, product sample, container, or packaging, according to claim 1, wherein a. said product, cross promotional product sample, container or packaging is used for providing a message to third parties in addition to the cross promotional message, product or scan-able URL two-dimensional code; or b. said URL-internet two dimensional code including cross promotional information about at least one selected from the group consisting of a box, carton, bottle, vial, tube, package, packet, envelope, or container; or c. said URL-internet two-dimensional code includes cross promotional information about cross-promotional products or services.

19. A method of providing cross promotional product, product sample, container, or packaging provided with a first product or service, comprising a uniform resource locator (URL)-internet directing two dimensional code and said product, cross promotional product sample, or packaging, said scan-able URL-internet directing two dimensional code linking to, a website or web page that is associated with: (i) one or more products or services; or (ii) one or more cross-promotional products or materials related to said one or more products or services, said method comprising:

(a) providing, making or using said product, cross promotional product, product sample, container, or packaging, said product, cross promotional product, product sample, container, or packaging comprising:

(i) a substrate having two or more surfaces, or singular surface container, pouch, or part, or bottle, or blow molded, injection molded, spun, stamped, embossed, heat fused, adhered, plastic, paper, metal, synthetic material parts;

(ii) a scan-able cross promotional URL internet directing two dimensional code associated with said substrate, container or part, said URL directing two dimensional code linked via a smart phone, internet tablet computer, or mobile technology device, to a website or webpage address including cross promotional information about cross-promotional products or services, said scan-able two dimensional code provided with, labeled on, printed on, lasered on, affixed to, molded in, or embossed on at least one surface of said substrate; or URL internet two dimensional code printed on a product, container, bottle, pouch, or part; and (iii) one or more products, cross promotional product sample, container, or packaging associated with said substrate or container, said products, cross promotional product sample, container, or packaging or interactive URL internet two dimensional code provided in a removable or non-removable printed area, sheet, wipe, vial, pouch, packet, patch, container, or pad associated with, or affixed to, at least a portion of a surface of the substrate, or URL internet two dimensional code printed on, molded, embossed, or stamped into product, container, bottle, pouch, or part; and (b) scanning and linking via a smart phone, internet tablet computer, or mobile technology device, said scan-able URL internet directing two dimensional code to said URL associated with one or more of said cross-promotional products or services, said scan-able two dimensional code provided with, printed on, labeled on, affixed to, or provided in scan-able form associated with at least one surface of said substrate;

wherein the cross-promotional product or service is not the same particular product or service as said first product or service.

* * * * *